July 7, 1953

C. R. GOLAY 2,644,351

SCRAP METAL BALER

Filed June 27, 1950

INVENTOR.
CHARLES R. GOLAY
BY Clifford C. Bradbury
ATTORNEY

July 7, 1953

C. R. GOLAY 2,644,351

SCRAP METAL BALER

Filed June 27, 1950

INVENTOR.
CHARLES R. GOLAY
BY Clifford C. Bradbury
ATTORNEY

July 7, 1953

C. R. GOLAY 2,644,351

SCRAP METAL BALER

Filed June 27, 1950

INVENTOR.
CHARLES R. GOLAY
BY Clifford C. Bradbury
ATTORNEY

July 7, 1953

C. R. GOLAY 2,644,351

SCRAP METAL BALER

Filed June 27, 1950

INVENTOR.
CHARLES R. GOLAY
BY Clifford C Bradbury
ATTORNEY

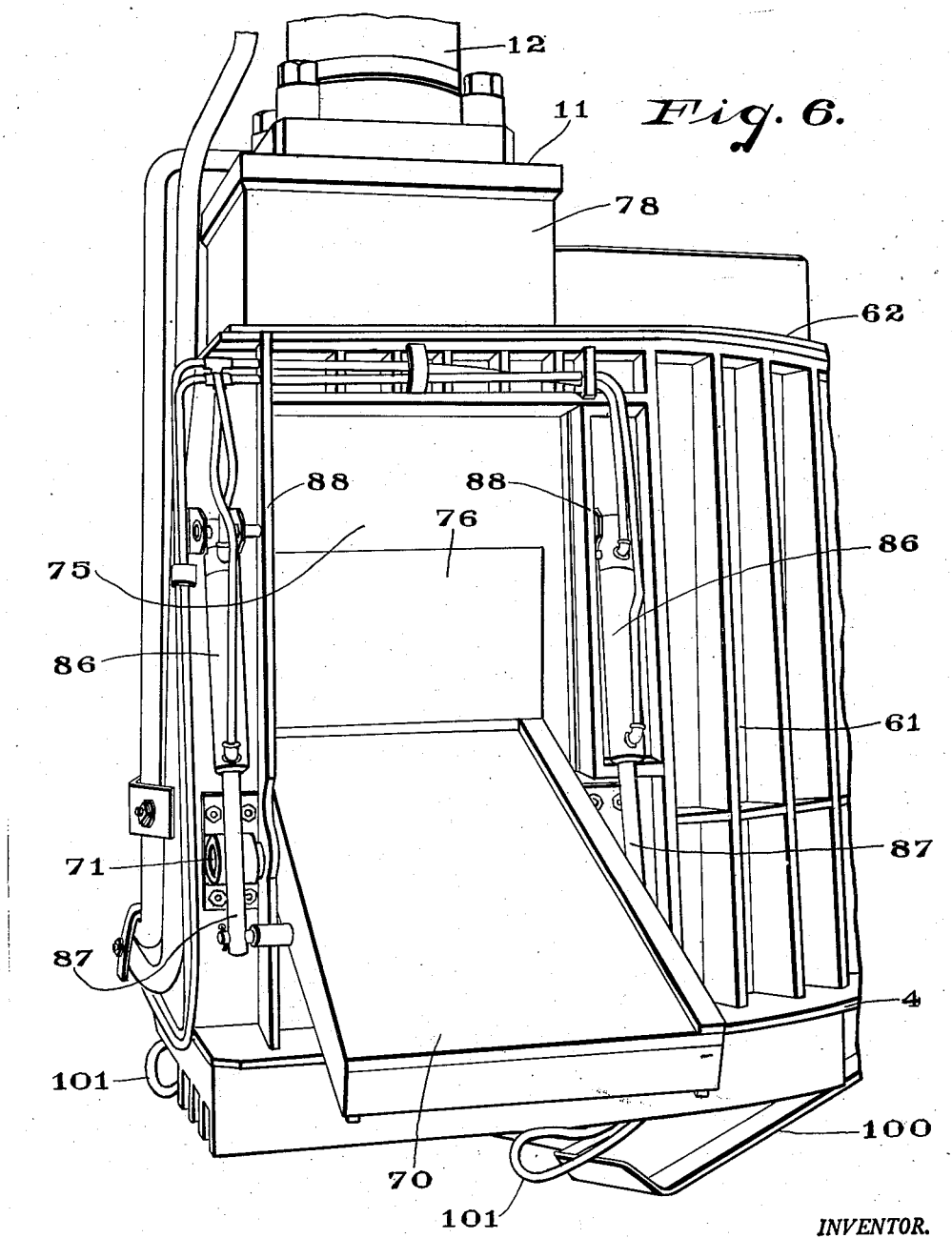

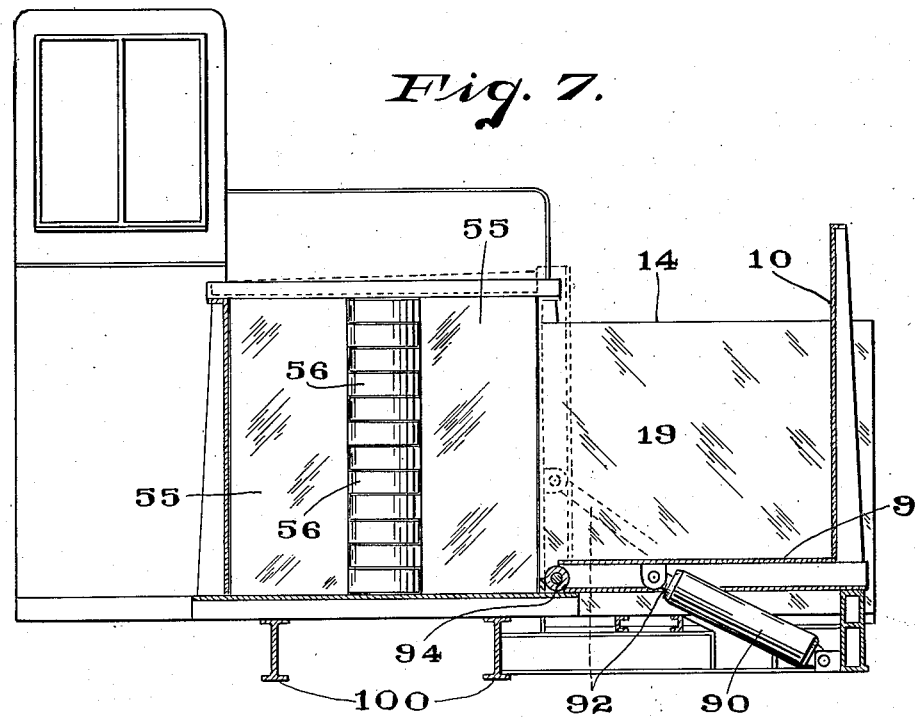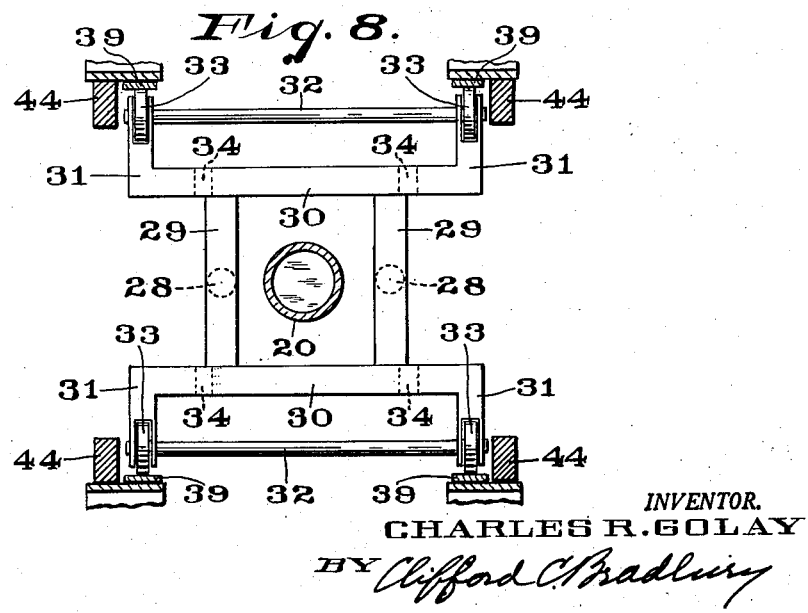

Patented July 7, 1953

2,644,351

UNITED STATES PATENT OFFICE 2,644,351

SCRAP METAL BALER

Charles R. Golay, Cambridge City, Ind.

Application June 27, 1950, Serial No. 170,505

7 Claims. (Cl. 78—0.5)

This invention relates to scrap metal balers.

One object of this invention is to provide baling apparatus of few and simple parts capable of converting metal scrap of practically any form into square prism bales with like bases and of sizes to be conveniently supplied to a smelting cupola.

Another object of the invention is to provide a portable self-contained baling apparatus capable of receiving the metal directly from a scrap pile of large area and treating it in a rapid and efficient manner to produce the usable bales.

Another object of this invention is to provide an apparatus in which only two rams are used for the compression operation, one acting to shape the bale in a longitudinal and lateral direction and the other in a vertical direction.

Another object of the invention is to provide a structure in which a substantially flat moving pressure plate compresses the metal into one corner of the prism forming box and then folds along the opposite corner of the prism until the opposite sides of the prism are parallel.

Another object of the invention is to provide a convenient form of container for the scrap metal in which one side member and a top cover are hinged to the structure to provide a receiving and loading hopper for the scrap when in open position, and a side wall and cover when in its closed position.

Other objects of the invention relate to the structural details and combination of parts for insuring easy portability and a sequence of smooth operation of the mechanism.

My invention is illustrated in the accompanying drawings, in which

Fig. 6 is a perspective front elevation showing parts of the discharge mechanism.

Fig. 7 is a section taken on the plane of line 7—7 of Fig. 1 showing a full line and a dotted line position of the hinged hopper of the baling bed, and Fig. 8 is a view looking toward the left into the rear end of the mechanism.

Briefly stated, a hydraulic ram operated crosshead, linked to a pair of pivotally connected or hinged horizontally movable plates which normally stand with their faces in a common plane, is moved bodily for a predetermined distance by the ram to compress the scrap metal in a longitudinal direction into a vertical right angled corner. At the end of the predetermined bodily movement of the pair of hinged plates, the further movement of the pivotal support for the plates is stopped and the continued movement of the ram piston swings the plates forwardly and laterally to a position at right angles to one another to form the metal into a square prism, which is further compressed in a vertical direction by a vertically supported hydraulic ram.

Figure 1:
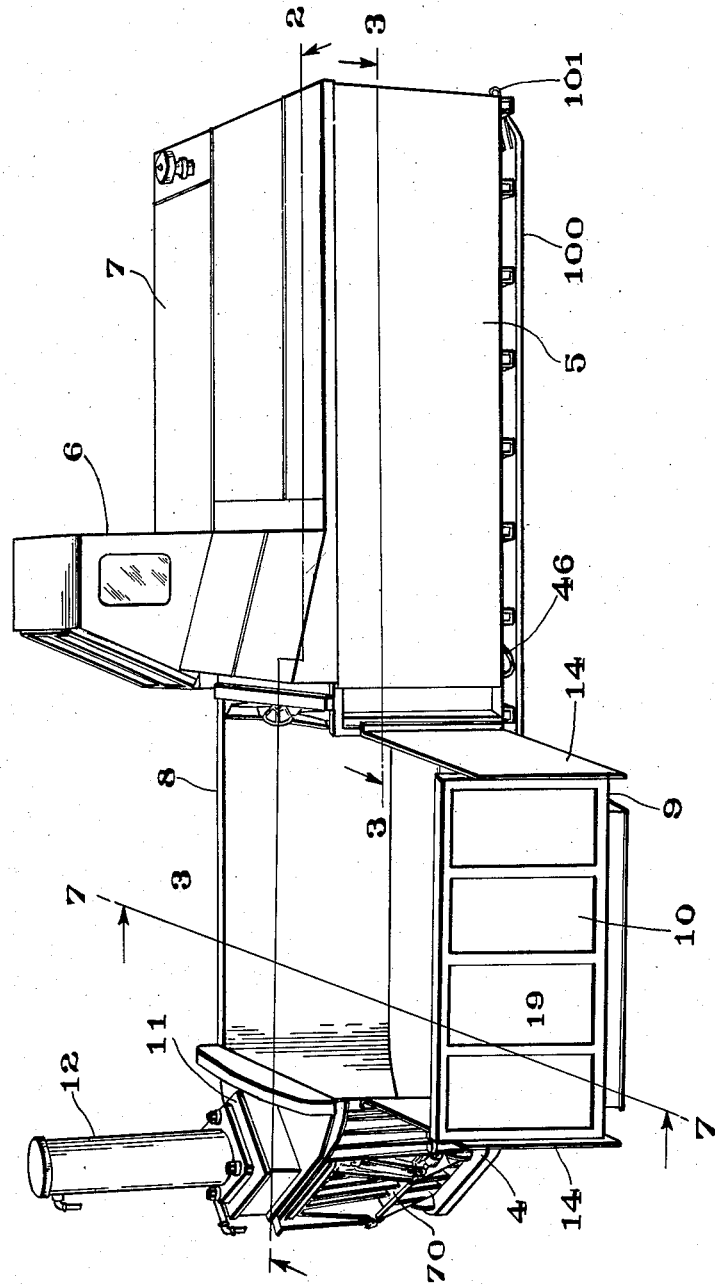
Fig. 1 is a perspective of an assembled baler with the loading compartment in open position.
Figure 2:
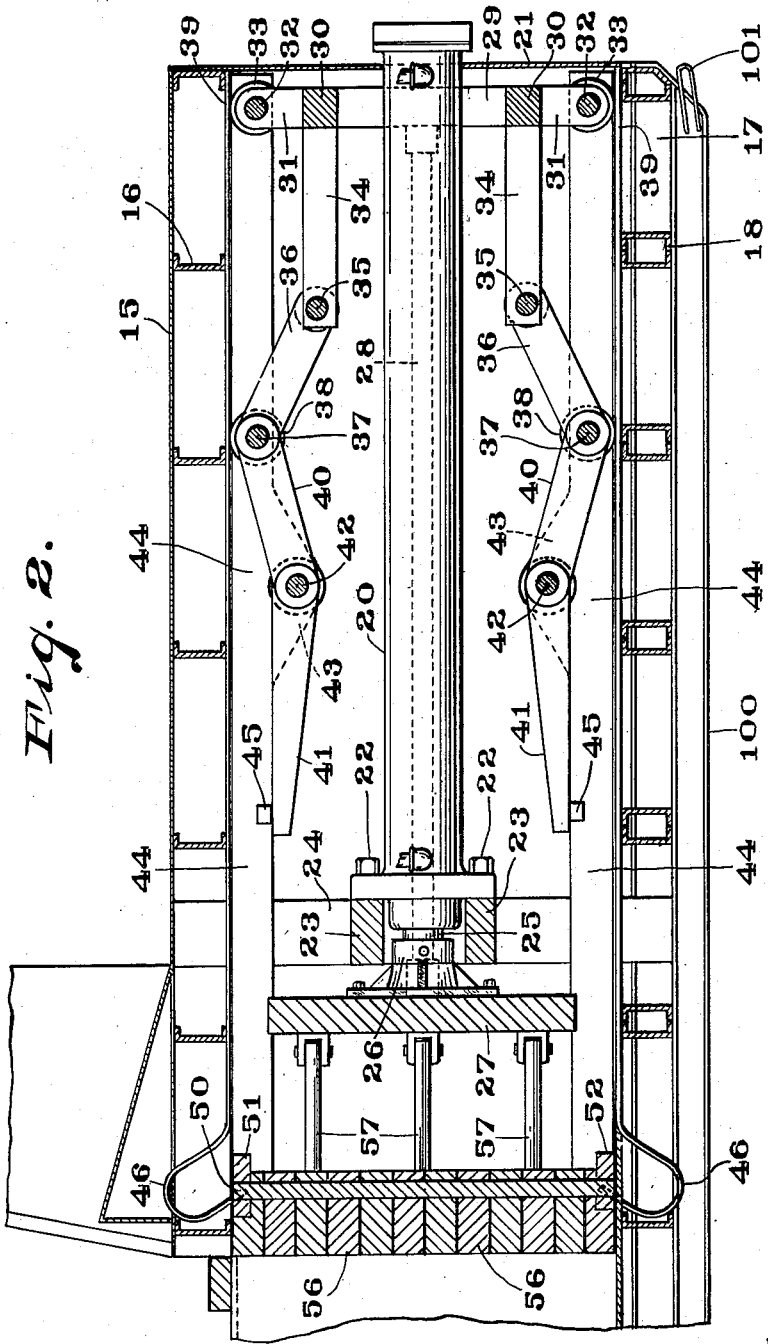
Fig. 2 is a vertical section of the right end of the baler, taken on the plane of line 2—2 of Fig. 1, illustrating the parts of the mechanism in normal position.
Figure 3:
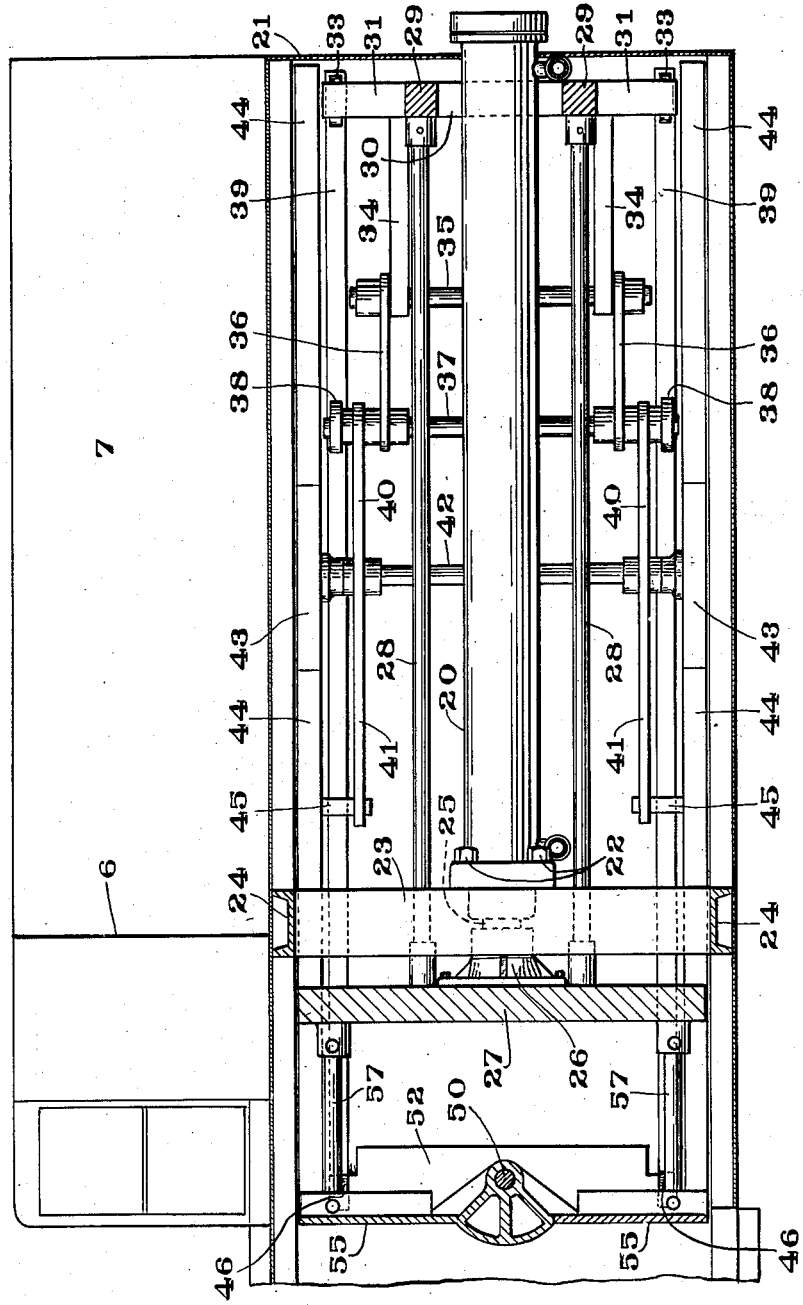
Fig. 3 is a horizontal section of the right end of the baler taken on the plane of line 3—3 of Fig. 1.

In Fig. 1, in which the general form of the apparatus is illustrated, a housing 5 encloses the operating mechanism of the baler, a cab 6 contains the control apparatus, and a housing 7 carries the power unit. The housing 5 opens into a baling bed 3, comprising a bottom plate 4, a fixed side plate 8, and a hopper 19, having a swinging side plate 9, and a top plate or cover 10. A support 11 for a vertical cylinder 12 is secured to the front end of the bed. Fixed end plates 14 extend laterally from one side of the bottom and cooperate with the swinging side plate 9 and the cover 10 to form a loading hopper 19 for the baling bed.

A rectangular frame is located within the housing 5, comprising upper longitudinal channel members 15, connected by cross-channels 16 and lower longitudinal channel members 17, connected by cross-channels 18. A hydraulic cylinder 20 is located about the central longitudinal axis of the rectangular frame with one end extending through and supported by an end plate 21 secured to the members of the rectangular frame. The cylinder is secured at its inward or forward end by bolts 22 to cross-beams 23. The beams 23 are secured to vertical posts 24, attached to the upper and lower frame members 15 and 17. A piston rod 25 is attached to a head 26. The piston head 26 is bolted to a heavy rectangular plate 27. Tie rods 28 are attached at their forward ends to the back face of the plate 27. At their rear ends the tie rods 28 are secured to a yoke comprising vertical frame members 29, connected between horizontal frame members 30. The frame members 30 terminate in right angled supports 31 for a pair of shafts 32, each carrying a pair of rollers 33. This structure is clearly shown in Fig. 8. Rigid arms 34 are secured to each of the frame members 30. Each of the rigid arms 34 is connected with a pivotal shaft 35. Each end of the pivotal shaft 35 extends through one end of a pivotal link 36. The opposite ends of the links 36 engage a second shaft 37 extending parallel with the shaft 35. A roller 38 is mounted upon each end of each shaft 37. Each roller 38 rides against a track plate 39 secured to an adjacent frame member 15 or 17. Two angular links 40, having extended ends 41, are connected at one of their ends with the shaft 37. Each angular link 40 is pivotally supported between its ends upon a shaft 42. The opposite ends of each shaft 42 are each supported in an angular boss 43 formed upon a longitudinally movable beam 44. Stop lugs 45 secured to and extending inwardly from each beam 44 are normally engaged by the extended end 41 of the angular link 40. An outwardly flared loop 46 is provided in the forward end of each track plate to receive the rollers 38 for the purpose hereinafter described.

A hinge post 50 is supported between upper and lower plates 51 and 52 which are secured between the upper and lower longitudinally movable beams 44. A pair of heavy flat faced plates 55 with interleaved hinging surfaces 56 is supported by the post 50. The combined area of the plates 55 is equal to the area defined by the walls of the baling bed 3 in its closed position. Laterally pivoted links 57 are connected between the front face of the rectangular plate 27 and the rear faces of the hinged plates 55 adjacent the outer edges thereof. The links 57 operate in response to relative bodily movement of the plate 27 and hinge post 50 to swing the plates 55 forwardly and inwardly toward each other.

Figure 4:
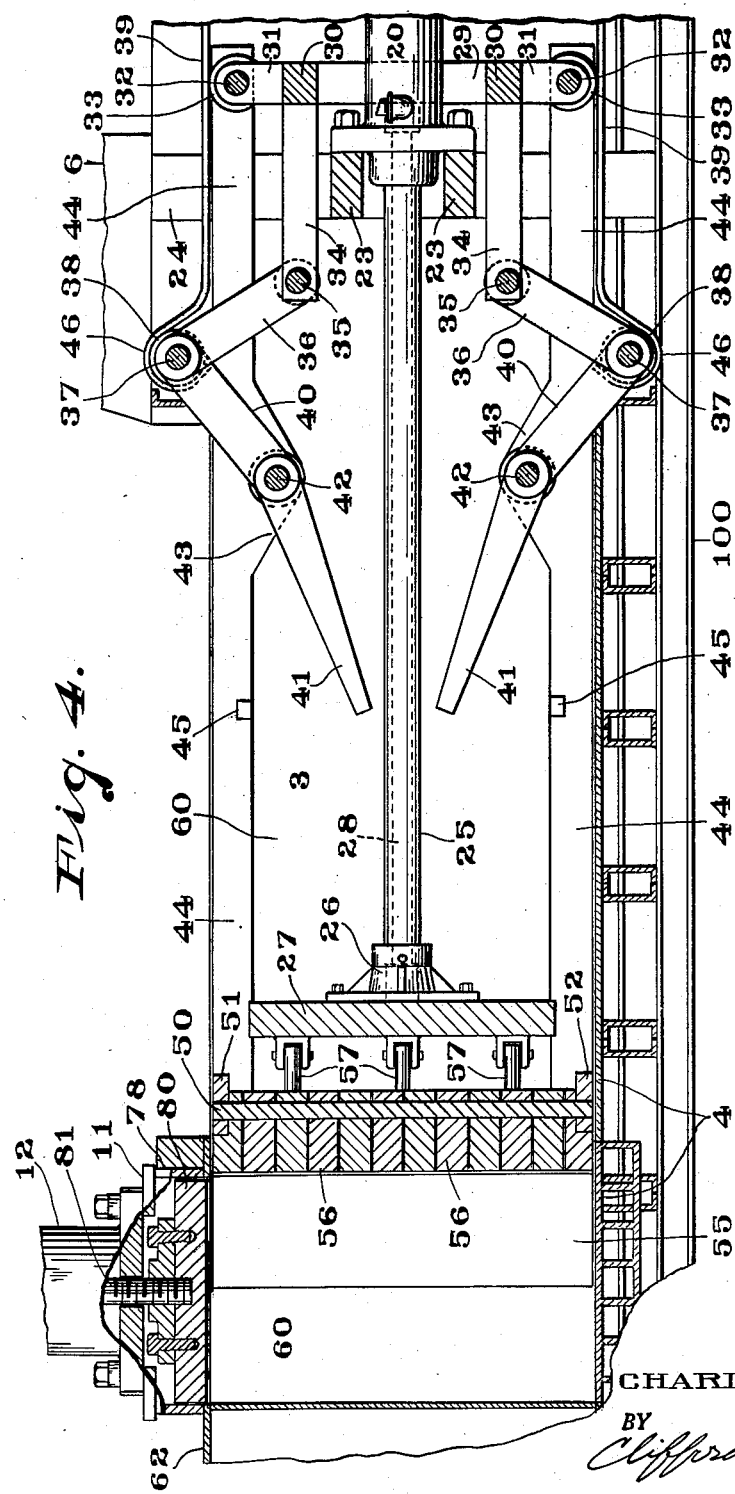
Fig. 4 is a vertical section of the left end of the baler, taken on the plane of line 2—2 of Fig. 1, to illustrate the operated positions of parts shown in Fig. 2.
Figure 5:
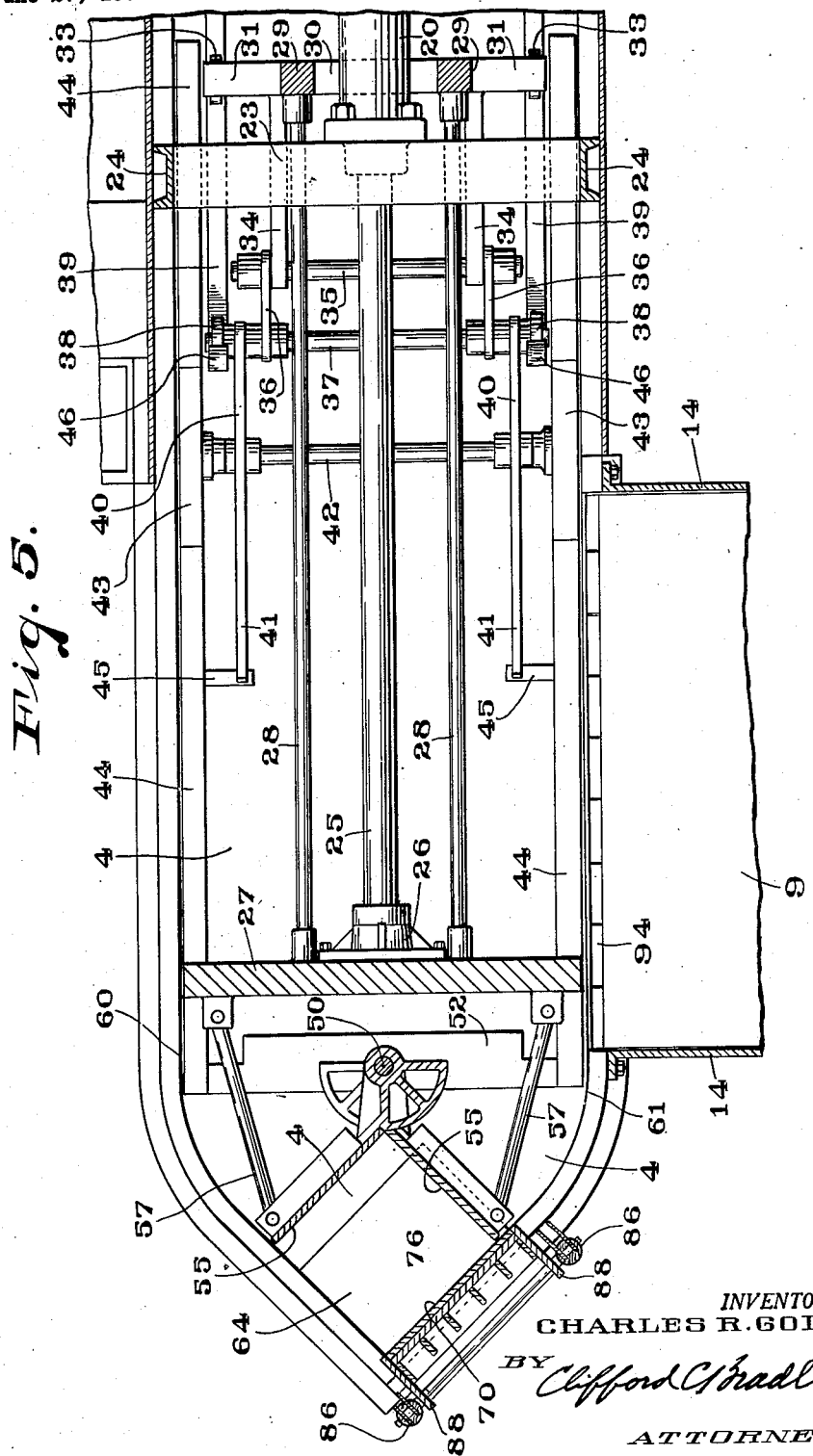
Fig. 5 is a horizontal section of the left end of the baler, taken on the plane of line 3—3 of Fig. 1, showing the parts illustrated in Fig. 3 in their operated position.

In the operation of the parts above described, pressure against the rear end of the piston 25 will move the plate 27 forwardly. This movement will be transmitted by the tie rods 28, comprising the frame members 29 and 30, through the arms 34, to the links 36 and 40, the shaft 42, and to the longitudinally movable beams 44. Since the pivot post 50 for the swinging plates 55 is carried by the beams 44, these plates will remain in a plane to present a flat surface to the contents of the baling bed in the preliminary movement of the parts. At a predetermined position in the first movement of the parts, the rollers 38 will be forced into the looped ends 46 of the track plates 39 to stop the forward movement of the rollers 38, the beams 44, and the hinge post 50. At this point, continued pressure upon the piston will transmit further movement through the tie rods 28, to the plate 27, due to the angular displacement of the links 36 and 40. This position of the parts is shown in Figs. 4 and 5. This final movement of the plate 27 will operate through the links 57 to swing the plates 55 forwardly and inwardly to apply a lateral shaping pressure to the material in the bed.

The forward end of the baling bed 3 comprises a pair of inwardly curved side walls 60 and 61, a top plate 62, and the bottom plate 4. The inside faces of the side walls have the same radius of curvature as the arcs proscribed by the outer edges of the plates 55 in their swinging movement. This insures intimate contact between the edges of the plates and walls which will prevent back flow of the baled material. The side walls 60 and 61 are joined at their forward edges to define two sides of a square prism 64, the other two sides of which are formed by the faces of the plates 55.

As shown in Fig. 6, a rectangular door 70 is supported on trunnions 71 within a rectangular opening 75 in the side wall 61 of the prism 64 to swing outwardly and downwardly, as shown in Fig. 6. A rectangular plate 76 is rigidly attached to and extends at right angles to the door 70. In the closed position of the door 70, the plate 76 lies flush with the bottom plate 4. A rectangular housing 78 is mounted upon the top plate 62 and opens downwardly therethrough into the forward end of the baler (Fig. 4). A square pressure block 80 is carried upon the lower end of a piston rod 81, movable in the vertical cylinder 12, mounted upon the housing 78. The face area of the pressure block 80 is the same as the area defined between the faces of the hinged plates 55 on two sides of the prism 64, and the inner faces of the sides 60 and 61 as the other sides when the plates 55 are in their extreme forward position. The downward movement of the pressure block 80 presses the material in the prism 64 against the rectangular plate 76 to complete the square prism bale, which is then discharged by dropping the rectangular door 70. The movement of the door 70 is controlled by a pair of hydraulic cylinders 86, the piston rods 87 of which are journaled on sides of the door 70, the cylinder being journaled on the door frame verticals 88. Fluid pressure in the lower ends of the cylinders raises and closes the door 70 while fluid pressure in the upper ends of the cylinders opens the door 70.

The loading hopper 19, shown open in Fig. 7, is controlled as to open and closed position by a pair of cylinders 90 journaled to the base at 91, and having piston rods 92 journaled to the under and outer part of the bottom and side panel 9. The bottom 9 becomes the side wall of the baler bed 3, and the side wall 10 becomes the cover for the baler bed 3 when the hopper is swung inwardly about the trunnion 94.

The hopper 19 being open, scrap metal is placed in it and in the baler bed 3 to any height not greatly exceeding the height of the hopper top plate 10. The swinging hopper 19 is then closed by applying liquid under pressure to the lower part of the cylinders 90. When the hopper, side wall 10 and bottom wall 9 are swung inwardly about the trunnion 94, the side wall 10 becomes the cover, and the bottom wall 9 becomes the side wall of the baler bed 3. As the result of this closing operation, the loose material to be baled is reduced to about one-half of its normal loose size.

After the baler bed 3 is enclosed on the bottom, top and sides, the presser plates 55 move forward. To accomplish the forward movement of the presser plates 55, fluid is forced into the cylinder 20, causing all of the associated parts to move forward through pressure applied from one part to another in the following order: The piston rod 25, its crosshead 27, push links 57 and hinged presser plates 55. The crosshead 27 also acts upon the rods 28, yoke frame members 29 and 30, rigid arms 34, links 36 and 40, cross-shaft 42, longitudinal movable beams 44, lower and upper crossbars 51 and 52, and the vertical presser plate pivot 50.

When all of the parts enumerated above have moved forward to a position in which the rollers 38 pass into the depressions 46, the beams 44, the crossbars 51 and 52, and the vertical presser plate pivot 50 stop their forward movement, while the crosshead 27 and the push links 57 continue to move forward. This causes the presser plates 55 to fold about their pivot 50 until the right and left presser plates stand at right angles to one another. As the two halves of the presser plate 55 swing inwardly, their outer vertical edges sweep the curved vertical walls of the baling bed 3 and compress the scrap material into a square prism.

While fluid pressure is maintained in the cylinder 20 to hold the presser plates 55 against movement, fluid pressure is applied to the top of the cylinder 12, causing its piston rod 81 and presser plates 80 to move downwardly, compressing the scrap material into a solid block or prism, which may be of substantially the height of the final compression chamber.

The presser plate 80 is now lifted by the application of pressure fluid below the piston in the cylinder 12. The door 70 is opened to allow the compressed block to slide out of the baler.

All of the parts are returned to their original positions by reverse fluid pressure.

The entire structure above described is mounted upon longitudinally extending skid runners 100. Each skid runner is provided at each end with a loop 101 to receive a tow cable from a tractor or other moving motor. By reason of this construction, the baling mechanism may be moved up to and along the scrap pile, thus eliminating the laborious and time consuming operation of transporting the material from the pile to the bales by trucks or other means.

It will be understood that in place of the skids with the tractor hitches, the apparatus may be mounted upon a wheeled truck hauled by a tractor or equipped with self-propelling means controlled from the cab.

While I have shown and described the structure with respect to details of construction, it is to be understood that many modifications thereof may be made without departing from the spirit or scope of my invention.

I claim:

1. A baling mechanism for forming prismatic bales of scrap metal in combination, a baling bed including a pair of spaced parallel side walls, end walls curving inwardly from the parallel side walls and terminating in straight portions which are joined together at their forward ends to form two sides of a substantially square prism, a stationary supporting frame comprising two upper and two lower channels, a hydraulic cylinder fixedly supported with its axis parallel with the channel frame members, a piston in the cylinder, a piston head, a plate secured to the piston head, a frame movable longitudinally of the stationary supporting frame, supporting rollers for the movable frame, tracks for the rollers attached to the supporting frame channels and provided at their forward ends beyond the end of its supporting frame with a stop portion to arrest the forward movement of the rollers, a yoke, pivotal links connecting the yoke with the forward carriage rollers, tie rods between the piston head and the yoke, a pair of presser plates hinged together and movable in the bed with their forward faces normally in a common plane, a hinge for the presser plates supported upon the forward end of the movable frame, and swinging link connections between the rear faces of the presser plates and the front face of the piston head adapted in the further energization of the ram after the forward movement of the movable frame has been arrested to swing the presser plates forwardly and inwardly with their edges adjacent the inwardly curving walls of the baling bed to form a square prism with the joined straight portions of the forward ends of the side walls of the bed.

2. In a scrap metal baling apparatus, a rectangular baling bed including parallel side walls and forwardly extending walls curving inwardly and terminating in substantially straight sections joined at their forward ends to define two sides of a substantially square prism, a pair of presser plates hinged together midway between the said side walls, means to move the hinged presser plates longitudinally and laterally of the baling bed with their edges adjacent the side walls to form with the forward ends of the side walls the other two sides of a substantially square prism, a horizontally supported hydraulic ram including a piston operatively connected with the presser plates to move them forwardly and fold them laterally to press the metal against the faces of the substantially straight portions of the side walls to form the metal into a substantially square prism, a vertically operated hydraulic ram mounted upon the forward end of the baling bed, and a presser plate connected with the vertical ram and movable in the prism defined by the forward extensions of the side walls and the front faces of the pressure plates to compress the substantially square prism of scrap metal in a vertical direction.

3. In a scrap metal baling press, a baling bed comprising a bottom plate provided in its forward end with a rectangular opening, a pair of parallel side walls having end portions curving inwardly and joined together at their forward edges to define two sides of a substantially square prism, one of said side walls being provided in its forward inwardly extending end with a rectangular discharge opening, an outwardly and downwardly swinging door in the rectangular opening, a rectangular plate secured to the inner lower edge of the rectangular door and normally lying upon the rectangular bottom of the bed, a pair of presser plates hinged together midway between the parallel side walls, a hydraulic ram connected with the hinged presser plates to move them first longitudinally between the side walls and then inwardly toward the faces of the inwardly extending ends of the side walls to form the scrap metal into a substantially square prism, a hydraulically operated vertically movable presser plate moved to compress the metal in a vertical direction against the rectangular plate carried by the swinging door, and hydraulically operated means for swinging the door to eject the bale, said latter means being made inoperable by the force of the bale on the rectangular plate while the vertical presser plate is in force against the top of the bale.

4. A scrap metal baler comprising in combination, a rectangular bed including a pair of parallel side walls, extensions of said walls joined together at their forward ends having inwardly curved surfaces on radii equal to substantially half the distance between the parallel portions of the side walls, a pair of vertically disposed presser plates each substantially equal in width to one-half the width of the rectangular bed, a hinge by which the presser plates are attached together at their adjacent edges for lateral swinging movement, a horizontally supported hydraulic ram including a piston connected with the presser plates to move them forwardly with their forward faces substantially in the same plane, means to arrest the forward movement of the hinge at the center of curvature of the side walls and connections between said ram and said presser plates to fold them laterally on their hinge in engagement with the curved surfaces at the forward ends of the side walls.

5. In a scrap metal baling mechanism, a baling bed comprising a bottom plate, a pair of parallel side walls, extensions of said walls joined together at their forward edges to define two sides of a substantially square prism, one of said side walls being provided in its forward end with a rectangular discharge opening, an outwardly and downwardly swinging door in the rectangular opening, a bottom plate for the prism space rigidly attached to the door, a pair of hinged presser plates, a horizontal hydraulic ram, means connected with said hydraulic ram and the presser plates to move them longitudinally, and additional means connected with said hydraulic ram and said presser plates to move them laterally toward the prism faces of the side walls to form the scrap metal into a substantially square prism, a hydraulically operated vertically movable presser plate to compress the metal in a vertical direction against the bottom plate adjacent the discharge opening, and hydraulically operated means for swinging the door for removal of the completed bale, the bottom plate attached to the door preventing the door from opening while pressure is applied to the bale by either the horizontal ram or the vertical ram.

6. A scrap metal baler comprising in combination a rectangular baling bed including a pair of parallel side walls, extensions of said walls terminating at their forward ends in surfaces curved inwardly on radii equal to half the distance between the parallel side walls, a pair of vertically disposed presser plates normally lying in the same plane, each equal in width to one-half the distance between the parallel side walls, interleaving tongues and grooves in adjacent edges of the presser plates, a hinge pin extending through the tongues of the presser plates perpendicular to the central longitudinal axis of the baling bed, a horizontally supported hydraulic ram, a piston head for the ram, connections between the piston head and the presser plates for moving the presser plates along the baling bed with the presser plates in the same plane, and swinging link connections between the piston head and the rear faces of the hinged presser plates responsive to the movement of the piston head to swing the presser plates around the hinge pin, in contact with the curved extensions of the side walls.

7. In a baling mechanism for forming prismatic bales of scrap metal in combination, a rectangular baling bed including a pair of parallel side walls, extensions of said side walls joined together at their forward ends to form two sides of a prism, a pair of hinged presser plates located in the container, a stationary rectangular supporting frame comprising pairs of upper and lower beams connected at their forward ends with the baling bed, a rectangular frame comprising upper and lower sets of bars movable longitudinally of the supporting frame and the baling bed, a carriage for the movable frame including a forward set and a rear set of rollers, track plates for the rollers attached to the beams each provided in its forward end with an outwardly flared loop to receive a forward roller, a hydraulic cylinder supported at its opposite ends by the supporting frame, a piston, a yoke connected with the piston, a set of pivotal links each connected at one end with the yoke and at its other end with a roller support, a stop on each bar of the movable frame, a set of outwardly swinging links pivotally supported one upon each of the bars of the movable frame with their outer ends serving as the supports for the forward rollers and their opposite ends beyond the pivotal support on the bars arrested against said stops but free to swing inwardly when forward movement of the rollers is arrested by engagement with the loop portion of the track plates to permit further forward movement of the piston to swing the presser plates around their hinge.

CHARLES R. GOLAY.

References Cited in the file of this patent

UNITED STATES PATENTS

| Number | Name | Date |
|---|---|---|
| 117,860 | Bushnell | Aug. 8, 1871 |
| 277,577 | King | May 15, 1883 |
| 823,703 | Sharp | June 19, 1906 |
| 1,319,608 | Nelson | Oct. 21, 1919 |
| 1,370,570 | Webb | Mar. 8, 1921 |
| 1,498,414 | Widell | June 17, 1924 |
| 1,879,356 | Lindemann | Sept. 27, 1932 |
| 2,371,762 | Langford et al. | Mar. 20, 1945 |
| 2,413,054 | Langford et al. | Dec. 24, 1946 |